United States Patent [19]

Gould et al.

[11] Patent Number: 4,570,663

[45] Date of Patent: Feb. 18, 1986

[54] DISTRIBUTION VALVE WITH DUAL CAMS TO PREVENT UNCONTROLLED EXCURSIONS OF VALVE BALLS

[75] Inventors: Charles M. Gould, Glendale; Andy F. Blake, Phoenix, both of Ariz.

[73] Assignee: Shasta Industries, Inc., Phoenix, Ariz.

[21] Appl. No.: 734,394

[22] Filed: May 14, 1985

Related U.S. Application Data

[63] Continuation-in-part of Ser. No. 487,758, Apr. 22, 1983, Pat. No. 4,523,606.

[51] Int. Cl.[4] .............................................. F16K 31/16
[52] U.S. Cl. ................................ 137/119; 137/624.14; 137/627; 137/630.2; 137/901
[58] Field of Search .................... 137/119, 624.14, 627, 137/630.2, DIG. 2

[56] References Cited

U.S. PATENT DOCUMENTS

| | | | |
|---|---|---|---|
| 1,588,528 | 6/1926 | Couch | 415/188 |
| 3,181,551 | 5/1965 | Coletti | 137/119 |
| 3,405,733 | 10/1968 | Hansen | 137/624.14 |
| 4,077,424 | 3/1978 | Ehret | 137/119 |
| 4,313,455 | 2/1982 | Pitman | 137/119 |

Primary Examiner—Robert G. Nilson
Attorney, Agent, or Firm—Cahill, Sutton & Thomas

[57] ABSTRACT

A distribution valve includes a housing having an upper fluid inlet, a plurality of bottom fluid outlets and enclosing a rotary impeller disposed directly beneath the fluid inlet, and a plurality of stationary baffles disposed between a bottom plate of the impeller and the fluid inlet for directing portions of the incoming fluid directly at a plurality of vertical vanes supported at the bottom plate of the impeller. A stationary planetary gear disposed about a vertical axis of the distribution valve engages a pair of symmetric gear assemblies supported on a rotary gear assembly base and each driven by a drive gear attached to the impeller. A foot-shaped cam is attached to the lower portion of the rotary gear assembly base and rotates through a 360° angle, sequentially lifting each of a plurality of spherical valve balls from its seat in the bottom of the housing. The radius of the cam, measured from its eccentric point to the point of initial contact with each valve ball, is shorter than the radius to subsequent contact points in order to obtain higher initial mechanical advantage. A ring-shaped cam also is attached to and rotates with the rotary gear assembly and has a skirt which holds all of the valve balls in their seats except when they are being lifted by the foot-shaped cam, thereby preventing oscillatory excursions of the seated valve balls.

11 Claims, 12 Drawing Figures

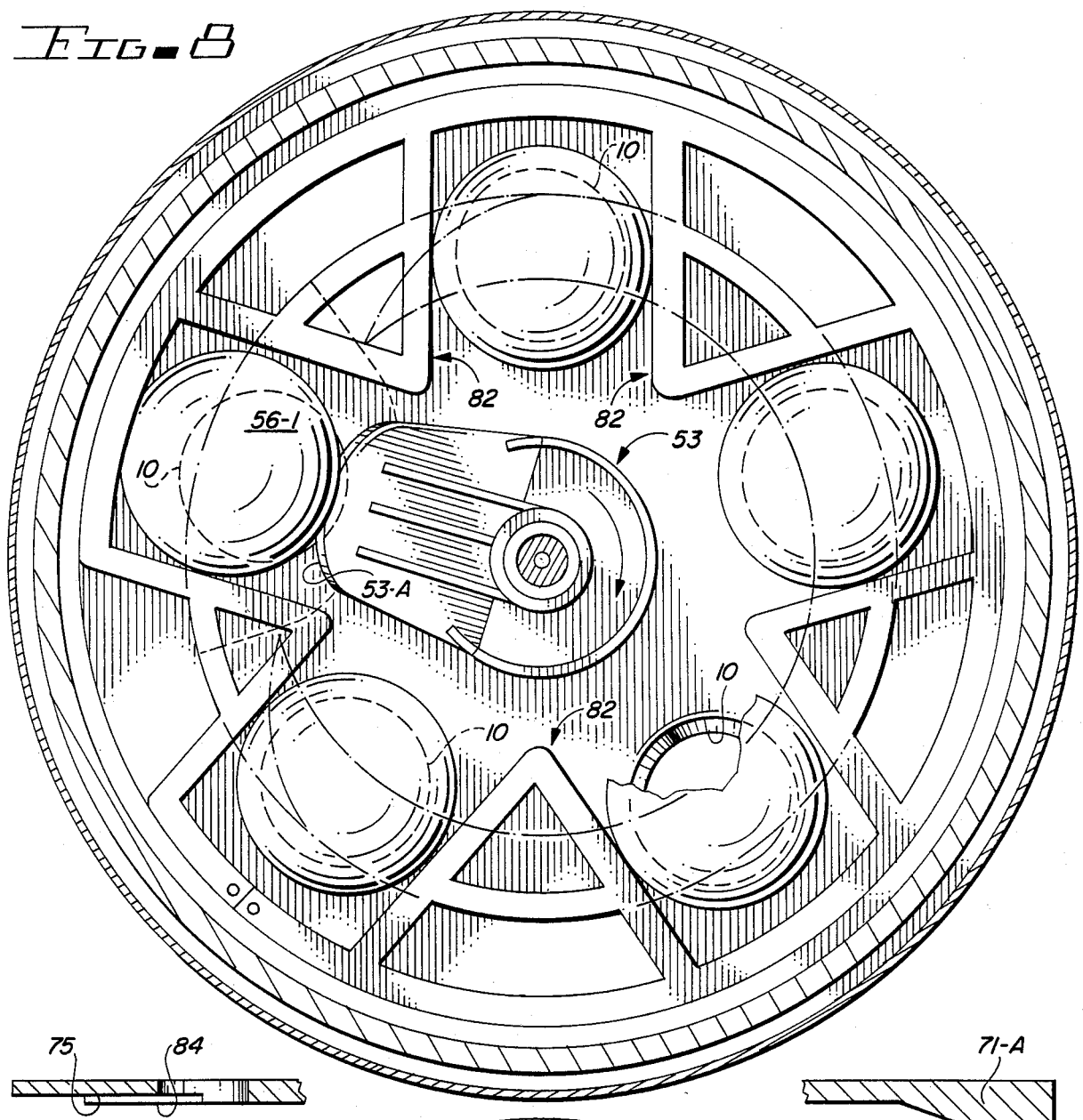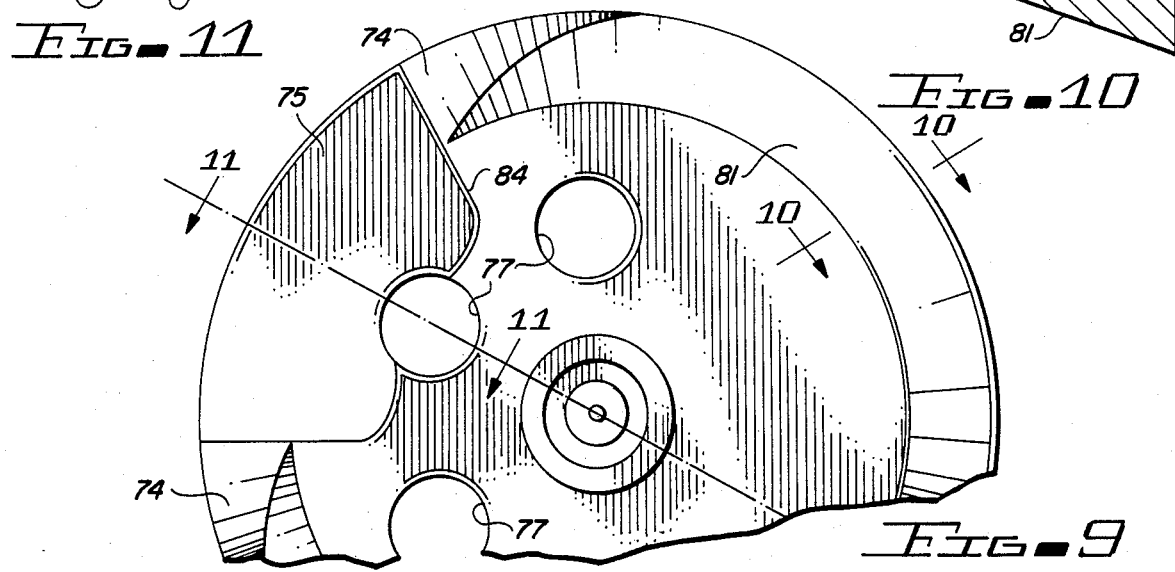

4,570,663

DISTRIBUTION VALVE WITH DUAL CAMS TO PREVENT UNCONTROLLED EXCURSIONS OF VALVE BALLS

This application is a continuation-in-part of our pending application "IMPROVED DISTRIBUTION VALVE", Ser. No. 487,758, filed Apr. 22, 1983, and now U.S. Pat. No. 4,523,606.

BACKGROUND OF THE INVENTION

The invention relates to fluid distribution valves of the type which sequentially open a plurality of outlet ports of a closed chamber that receives pressurized fluid via an inlet port, and more particularly to an improved distribution valve having a high efficiency impeller, gear assembly, a sequential valve actuation mechanism, and a dual cam mechanism adapted to prevent undesired excursions of valve balls when they are supposed to remain seated.

Multi-outlet fluid distribution valves that receive fluid under high pressure through an inlet port and distribute the fluid, one port at a time, through sequential outlet ports are commonly used in self-cleaning swimming pool systems. In such systems, swimming pool water is pumped at high pressure, typically roughly twenty to forty pounds per square inch, into the inlet port of the distribution valve. The outlet ports are coupled by lengths of PVC pipe to spaced "cleaning heads" that are installed in the bottom of the swimming pool surface and eject rotary jets of high pressure water along the bottom of the pool to effectively "sweep" circular areas around each cleaning head. For example, a fluid distribution valve somewhat similar to the one disclosed in U.S. Pat. No. 3,405,773, issued to K. W. Hansen on Oct. 15, 1968 and assigned to the present assignee, has been proposed. However, experience in the swimming pool industry has indicated that there is a need for a further improved implementation of the subject distribution valve. Chemicals commonly used in swimming pool water have been found to gradually weaken and degrade some of the plastic and metal components that have been used in prior distribution valves. Some of the prior distribution valves have not been reliable in the presence of substantial variations in the inlet pressure, or at low water flow rates. In some cases, build-up of debris on some of the components of prior distribution valves has interfered with their proper operation, increasing maintenance costs, especially when the chemical balance of the swimming pool water has not been properly maintained.

The distribution valve described and claimed in the above-identified parent application, and also described herein with reference to FIGS. 1-5, solved many of the problems of earlier fluid distribution valves.

However, one problem, an intermittent one, that has been found to occur with the distribution valve of FIGS. 1-5 is that in certain installations, the momentum of water in pipes connected between the fluid outlet port and cleaning heads disposed on the bottom surface of a swimming pool apparently causes vacuum conditions in those lines as the ball valves become seated, producing a reversal of forces on the fluid in the lines and reversing the momentum of the fluid. This causes the ball valves to then become unseated. In some instances, this sequence of events would occur in a continuous oscillatory manner, causing an undesirable, noisy, stress-producing "hammering" of the ball onto and off of its seat when the ball actually was supposed to remain seated, i.e., closed.

Several techniques for solving this problem have been investigated by us, including provision of check valves under each ball, and providing means for letting a small amount of air into the lines in response to the occurrence of a vacuum produced by momentum of fluid in the line connected to the fluid outlet port of the distribution valve. These techniques have been found to be unsatisfactory.

Thus, there remains a need for a further improvement of the distribution valve described and claimed in the above-identified parent application to prevent undesired oscillatory or repetitive "hammering" of ball valves that should be seated, as a result of momentum reversals of fluid in the outlet lines.

Accordingly, it is an object of the invention to provide an improved distribution valve that operates reliably at low inlet pressures and low fluid rates, is more resistant to degradation caused by swimming pool chemicals, and requires less maintenance than prior distribution valves.

It is another object of the invention to provide an improved distribution valve that prevents repetitive "hammering" or partial opening and closing of ball valves in the improved distribution valve as a result of momentum reversals of fluid in outlet lines connected to outlet ports of the distribution valve.

SUMMARY OF THE INVENTION

Briefly described and in accordance with one embodiment thereof, the invention provides an improved fluid distribution valve including an inlet port for receiving fluid at high pressures and a plurality of fluid outlet ports, and also includes an internal outlet port valve actuation mechanism including a plurality of spherical valve balls that normally rest on circular seats closing the respective outlet ports, a foot-shaped rotary cam for sequentially unseating the ball valves, wherein the cam is driven by a gear assembly that in turn is driven by a high efficiency impeller positioned beneath the inlet port, and a ring-shaped cam also driven by and rotating with the gear assembly that prevents undesired displacements of the ball valves from their seats except when they are being lifted by the foot-shaped rotary cam in order to open a particular outlet port. In the described embodiment of the invention, the foot-shaped cam has a modified oval configuration that causes a peripheral edge thereof to initially engage each valve ball at a point whereat the effective radius of the cam is shorter than the radii of subsequent points at which the cam contacts that valve ball to unseat it, thereby providing a large initial mechanical advantage. The "toe" portion of the cam maintains the previously unseated valve ball in an unseated configuration until the present valve ball becomes at least slightly unseated, in order to avoid build-up of excessive fluid pressure in the interior of the distribution valve. The ring-shaped cam includes a circular flange that extends downwardly almost to the surface of each of the seated balls, preventing them from being lifted from their seats. The flange terminates in a sloped fashion so as to leave a gap wide enough to allow only one of the valve balls, namely the one being lifted by the foot-shaped cam, from its seat, allowing the corresponding outlet port to be opened so fluid entering the distribution valve from the fluid inlet is distributed to that outlet port. A plurality of rigid vertical dividers are disposed radially between each of the valve balls to prevent them from being displaced sideways and thus causing "binding" as the sloped edge of the ring-shaped cam passes over the valve balls.

The foot-shaped cam has a downwardly extending "heel" that minimizes friction between the cam and the bottom surface of the distribution valve housing. The gear assembly includes two symmetrical gear trains each supported on a rotary gear support plate to which the foot-shaped cam is rigidly attached. An inner gear of each gear train is driven by a drive gear attached to the impeller. An outer gear of each of the symmetrical gear assemblies engages a stationary planetary gear, thereby causing the gear support plate to rotate in response to rotation of the impeller. The impeller includes a horizontal star-shaped base plate with a plurality of vertical vanes attached thereto. Water received under high pressure from the inlet port is deflected by a plurality of vertical, semi-cylindrical, outwardly oriented baffles that extend nearly to the surface of the star-shaped base plate of the impeller to deflect the incoming water against the horizontal surfaces of the star-shaped sections and directly against the vanes. As the impeller continues to rotate, V-shaped gaps between the star-shaped protrusions allow water to pass downward into the gear assembly after the energy of the water has been expended in rotating the impeller.

BRIEF DESCRIPTION OF THE DRAWINGS

FIG. 8 is a section view taken along section line 8—8 of FIG. 6

FIG. 9 is a section view taken along section line 9—9 of FIG. 6.

FIG. 10 is a section view taken along section line 10—10 of FIG. 9.

FIG. 11 is a section view taken along section line 11—11 of FIG. 9.

FIG. 12 is a side view of the upper cam shown in FIGS. 6 and 7.

DESCRIPTION OF THE INVENTION

Figure 1:
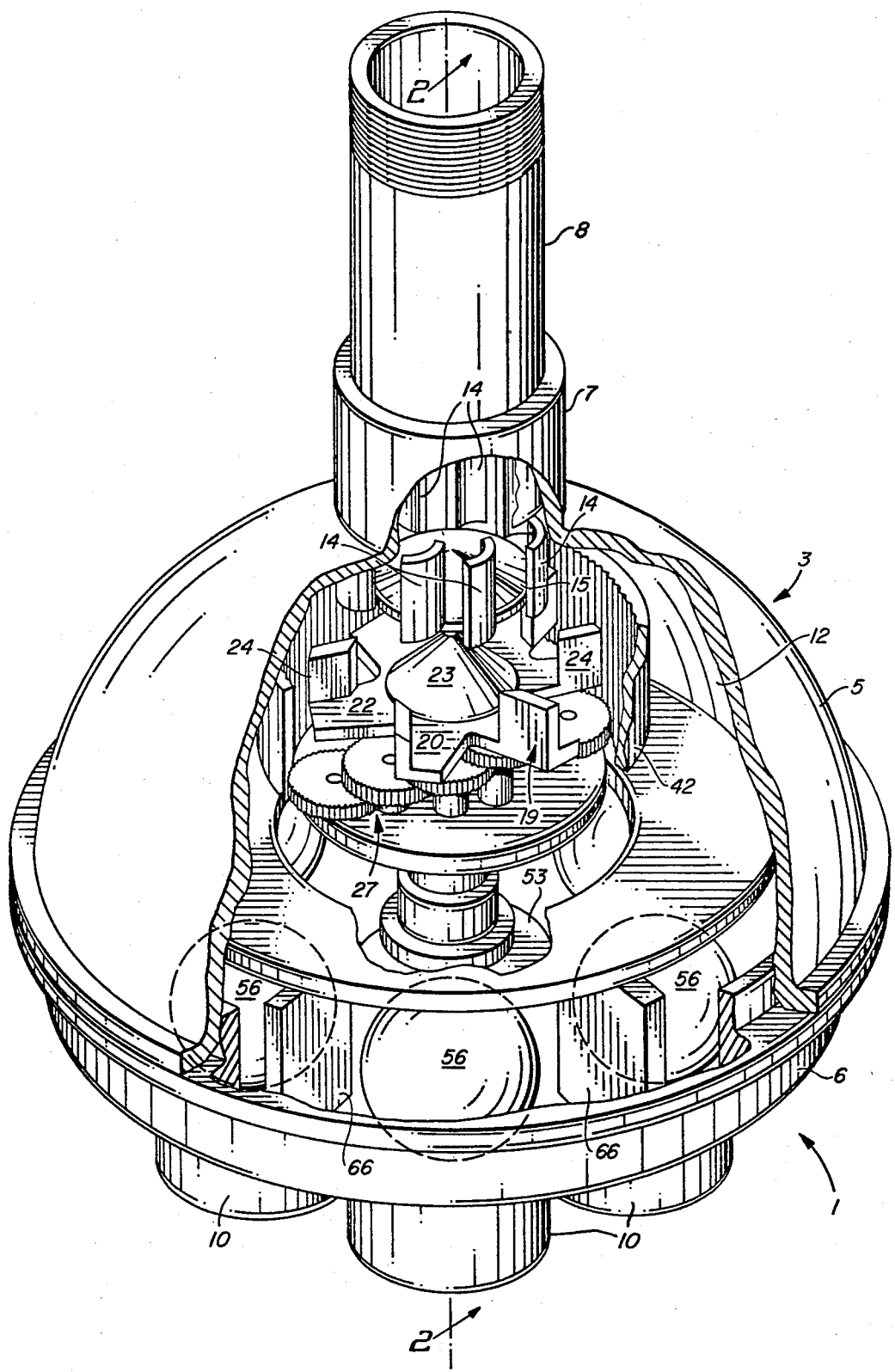
FIG. 1 is a partial perspective cutaway view of the distribution valve of the present invention.

Referring now to the drawings, especially FIG. 1, fluid distribution valve 1 includes a housing 3 having an upper dome-shaped portion 5 and a lower section 6 that is severable from, but is normally sealably attached to, upper section 5. At the peak of upper section 5 there is a cylindrical inlet port 7. An inlet tube 8 is received by inlet port 7. Housing 3 includes inlet port portion 7 and upper section 5 and also includes five outlet ports 10 which are disposed on the bottom surface of lower housing section 6. Housing 3 is composed of glass-filled polycarbonate. Inlet tube 8 can be composed of any conventional pipe material such as PVC pipe.

Inside housing 3 there is an open chamber 12. Just beneath inlet port 7 and attached to the upper interior surface of upper housing portion 5 there are a plurality of vertical "diversion baffles" 14, each of which is preferably molded integrally with upper housing section 5. Each baffle 14 has a generally semi-cylindrical shape. Typically, there are eight such equally spaced baffles. Attached to the lower inner edge of each of the vertical baffles 14 is a cone 15. As subsequently explained, the purpose of baffles 14 and cone 15 is to divert high pressure water from inlet port 7. This inlet water first is forced on inlet port 7 onto cone 15, so that it is diverted uniformly outward against the vertical baffles 14. Baffles 14 then deflect equal portions of the inlet water against the star-shaped protrusions 30 (FIG. 5) of impeller 19.

At this point, it should be emphasized that baffles 14, cone 15, and impeller 19, as they appear in FIG. 1, are shown in a somewhat distorted, "exploded" manner for clarity of illustration. As can be seen from the section view of FIG. 2, impeller 19 actually fits very closely underneath cone 15, and the baffles 14 extend much further downward so that their lower edges almost touch the bottom surface 20 of star-shaped base plate 22 of impeller 19. The center portion of base plate 22 has a centered, cone-shaped peak 23 that fits closely up inside of the underside of cone 15. A plurality of vertical vanes 24 are disposed on the edges of each of the six protrusions 30 (FIG. 5) of impeller 19. A drive gear 25 (FIG. 2) is attached to the center of the lower surface of impeller 19. Drive gear 25 engages the two inner gears of gear assembly 27, described subsequently.

Figure 5:
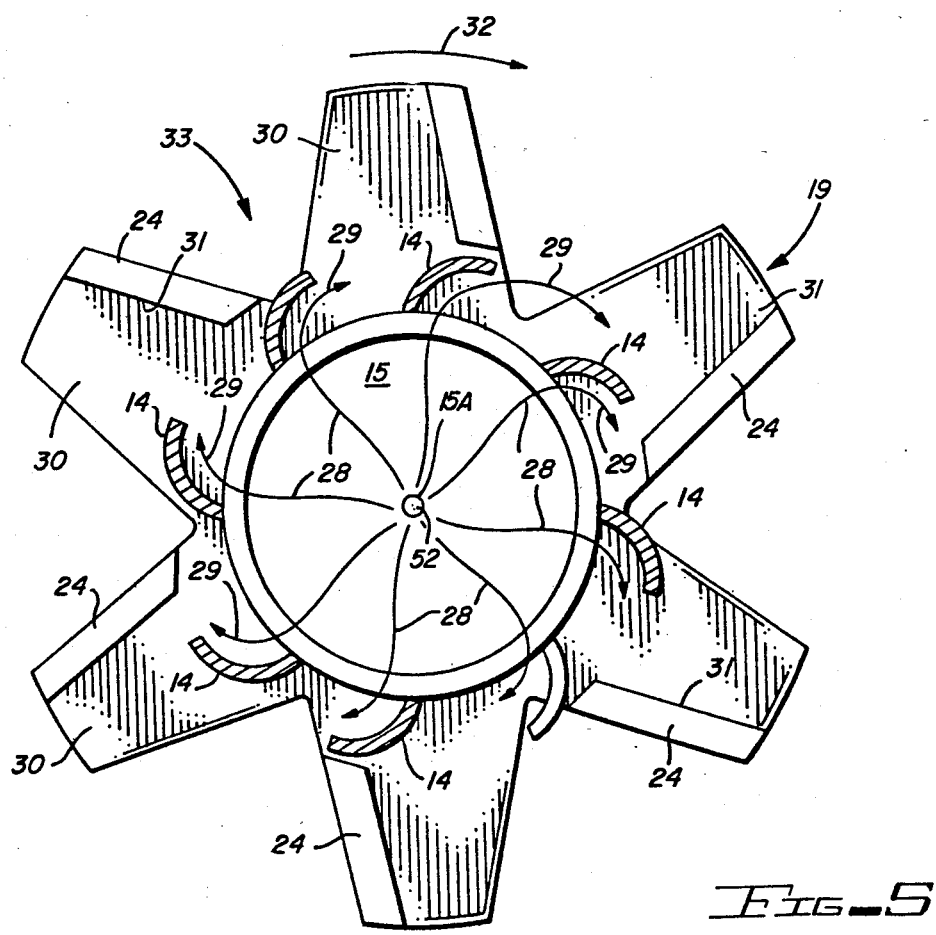
FIG. 5 is a section view taken along section line 5—5 of FIG. 2 illustrating the relative position of the diversion baffles and the impeller of the distribution valve.

First, however, the configuration of baffles 14 and impeller 19 are described in more detail with reference to FIG. 5, which is a section view taken along section line 5—5 of FIG. 2. In FIG. 5 it can be seen that water flowing from inlet port 7 downward at high pressure onto cone 15 first is directed by peak 15A thereof and then flows uniformly outward in all directions, as indicated by arrows 28. The downwardly, outwardly moving water then strikes the vertical baffles 14 and is deflected clockwise in the direction indicated by arrows 29.

In accordance with one aspect of the present invention, the large upper surface areas of the six protrusions 30 of impeller 19 cooperate with the vertical baffles 14 to greatly confine the direction of flow of high velocity water to the general direction of arrows 29. This water then directly strikes the inner faces 31 of the vertical impeller vanes 24, resulting in a high clockwise impeller torque in the direction of arrow 32. The vertical baffles 14 are stationary, so as impeller 32 rotates, the V-shaped gaps such as 33 between adjacent protrusions 30 of impeller 19 allow the water deflected by cone 15 and baffles 14 to flow downward into the lower portion of chamber 12 after the force of that water has been spent in turning impeller 19. This feature results in a relatively low drop in "head pressure" of the water from inlet port 7 to the presently open one of outlet ports 10.

It should be noted that each of vertical impeller vanes 24 has an inner vertical edge which barely clears the outer surfaces of the vertical baffles 14 as impeller 19 rotates.

We have found that the above-described configuration of impeller 19, vertical baffles 14, and cone 15 results in very high impeller torque even at very low inlet water flow rates and pressures.

Figure 4:
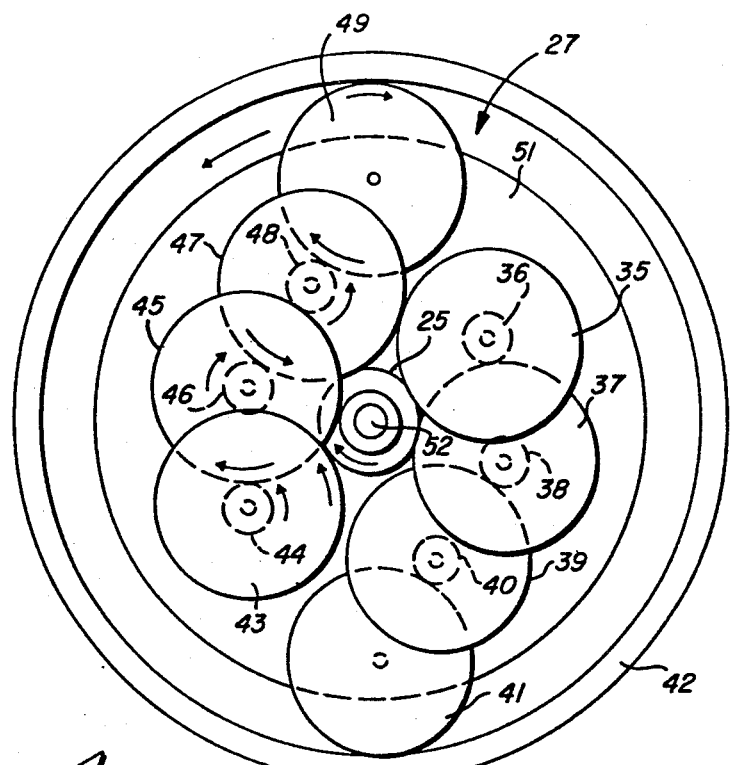
FIG. 4 is a plan view of the planetary gear assembly of the distribution valve taken along section line 4—4 of FIG. 1.

Next, the gear assembly 27 will be described. It includes two symmetrical chains of gears each driven by impeller gear 25. The configuration of gear assembly 27 can be best visualized by referring to FIG. 2 and also to FIG. 4, which is a section view along section line 4—4 of FIG. 2. The first such chain of gears includes a first large gear 35 which is driven by impeller gear 25. Gear 35 turns small coaxial gear 36, which in turn drives another large gear 37. Large gear 37 turns a coaxial small gear 38, which in turn drives large gear 39. Gear 39 turns small coaxial gear 40, which in turn drives large outer gear 41. The teeth of outer gear 41 engage the inner teeth of a stationary planetary gear 42 that preferably is molded integrally with upper housing section 5. Similarly, and symmetrically with the above-described first chain of gears, impeller gear 25 also drives large gear 43, which turns coaxial small gear 44. Gear 44 turns large gear 45, which turns coaxial small gear 46. Gear 46 turns large gear 47, which turns small coaxial gear 48. Finaly, small gear 48 turns large outer gear 49, which engages the teeth of planetary gear 42 on the opposite side of a rotary gear support plate 51, which rigidly supports the shafts or axles about which each of the above-mentioned gears rotates.

Each of the small gears 36, 38, etc., has nine teeth. Each of the large gears, such as 35, 37, etc., has thirty-six teeth. Impeller gear 25 has sixteen teeth, and finally, planetary gear 42 has one hundred-twenty inner teeth, leading to a reduction ratio between impeller 19 and gear support plate 51 of four hundred-eighty turns of impeller 51 to one turn of gear support plate 51, and hence of cam 53.

Figure 2:
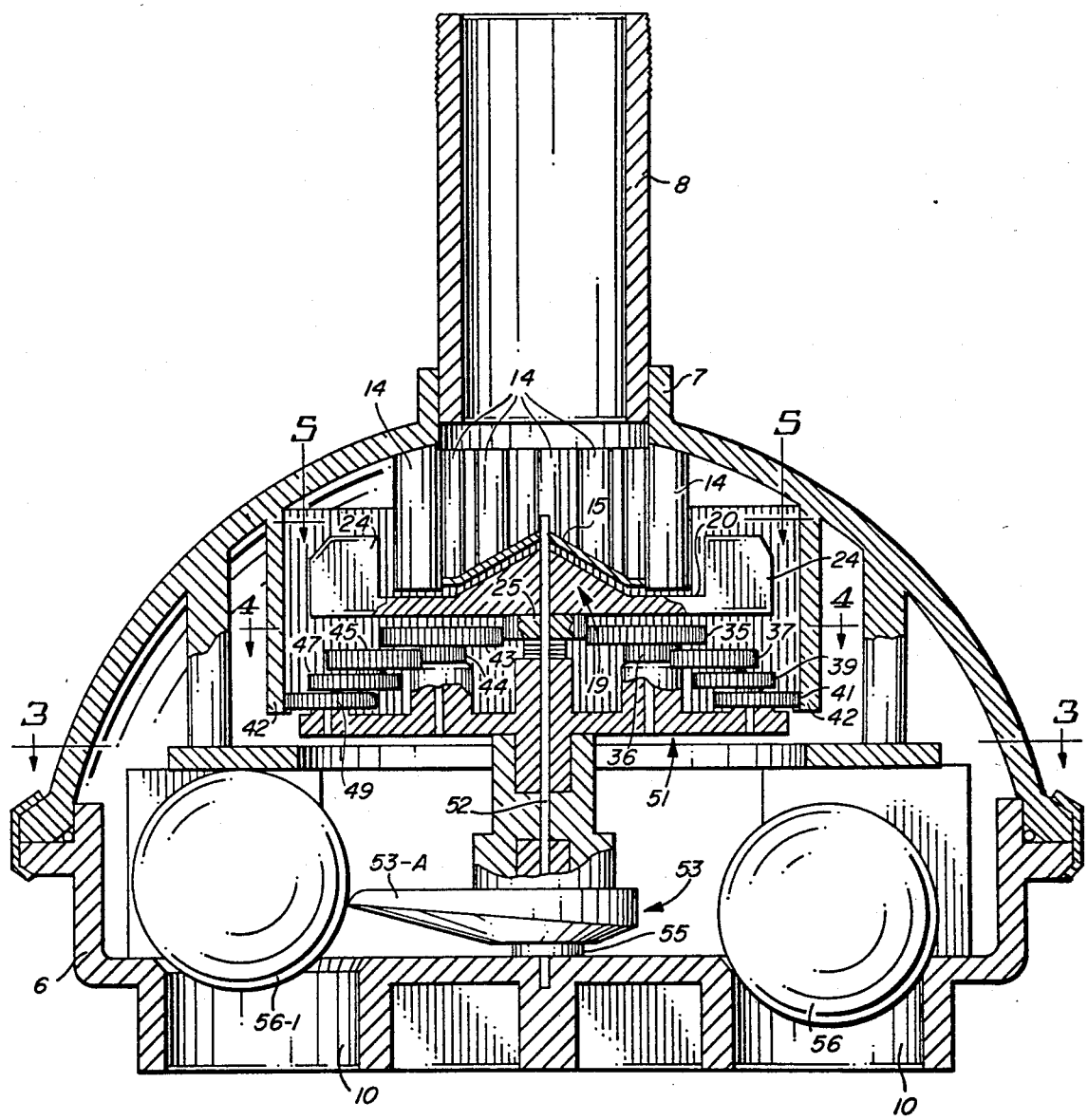
FIG. 2 is a section view of the distribution valve shown in FIG. 1, taken along section line 2—2.

At this point, it can be seen by reference to FIG. 2 that a vertical axle 52 is supported by the bottom of lower housing section 6 and has an upper end extending through and supported by the upper peak portion of cone 15. Vertical axle 52 functions as an axis about which impeller 19, gear support plate 51, and cam 53 rotate.

Figure 3:
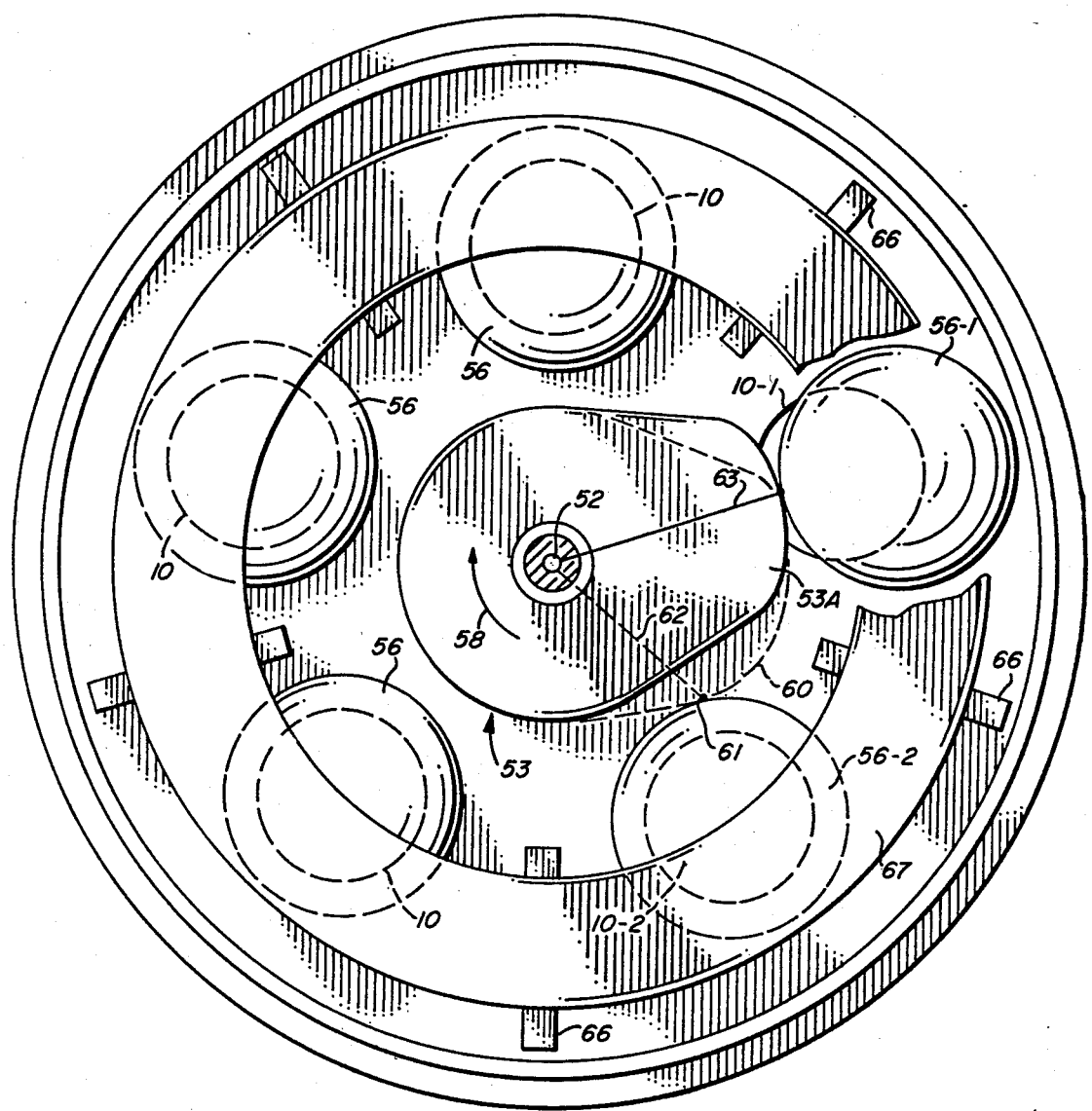
FIG. 3 is a section view taken along section line 3—3 of FIG. 2.

Attached rigidly to the bottom of gear support plate 51 is a foot-shaped cam 53. As best seen in FIG. 3, which is a sectional view along section line 3—3 of FIG. 2, the lower foot-shaped portion of cam 53 has a roughly eliptical configuration and rotates eccentrically about axle 52. The lower surface of the eccentric rotation point of cam 53 has a washer-shaped spacer 55 thereon which supports cam 53 and the entire gear assembly and rotary gear support 51 with a minimum amount of friction as cam 53 rotates.

The five outlet ports 10 each have an inclined upper peripheral edge surface that mates with one of the five acrylic valve balls 56. Normally, each of the acrylic balls 56 is seated in a respective one of ports 10 to close that port. The high water pressure in the interior chamber 12 of distribution valve 1 produces additional downward force on each of the valve balls 56, further improving their sealing action. In accordance with the operation of distribution valve 1, gear support plate 51 rotates cam 53 in the direction indicated by arrow 58 (FIG. 3).

The shape of the most outwardly extending, ball-contacting portion 53A of cam 53 is such that at least one of valve balls 56 is always at least partially unseated, as is ball 56-1 in FIGS. 2 and 3, causing at least one of outlet ports 10 to be at least partially open. The width of ball contacting or "toe" end portion 53A of cam 53 is such that cam 53 rotates from the configuration shown by solid line 53 in FIG. 3, wherein port 10-1 fully open a maximum amount to the position indicated by dotted lines 60. The first point of cam 53 to tough ball 10-2 in FIG. 3 is point 61. The radius of cam 53 to point 61 is designates by reference numeral 62.

Radius 62 is substantially shorter than the maximum contact point radius 63. Clearly, the initial mechanical advantage at initial contact point 61 is greater than for subsequent contact points at which cam 53 engages each valve ball.

For a small portion of the rotation of cam 53, both ball valves 56-2 and 56-1 are partially open. The fact that each subsequent valve ball is partially unseated before the previous one is re-seated prevents water pressure from building up to too high a level inside chamber 12 and also the resulting force of that ball on cam 53 aids unseating of the next ball 56.

In order to prevent valve balls 56 from becoming unseated and rolling around inside chamber 12, a plurality of vertical dividers 66 are positioned midway between each pair of adjacent valve balls. The dividers 66 are supported by an attached ring 67, and can be removed as a unit.

We have undertaken considerable experimentation to determine optimum materials for the gears. At this point, DELRIN plastic material seems to be most satisfactory because it has adequate strength in the models we have tested. However, it has the shortcoming that if the swimming pool owner does not maintain the proper chemical balance in the pool, i.e., if he allows the acid concentration to become too high, the DELRIN material deteriorates. However, if the pH level of the pool water is maintained properly, DELRIN plastic gears provide excellent performance and reliability.

The above-described distribution valve has been found to provide very little loss in head pressure, due to its open internal chamber structure. The above-described impeller structure, in combination with the cone 15 and vertical baffles 14 (both of which are known in the art) along with the star-shaped protrusions 30 of impeller 19 and vertical vanes 24 mounted on the edge portions thereof, has been found to provide adequate torque to operate cam 53 at extremely low inlet water pressures. The presence of the large V-shaped gaps 33 (FIG. 5) between the protrusions 22 of impeller 19 results in lower water pressure loss as the water is exhausted from impeller 19. The relatively high turbulence produced beneath impeller 19 continually flushes all of the gears in gear assembly 27, preventing potentially harmful residues from forming thereon. The symmetric, dual chain of gears in gear assembly 27, in conjunction with the planetary gear 42, provides balanced rotational forces on gear support plate 51 that have been found to produce excellent performance with minimum gear wear with a relatively low number of total gears in the system. The shape of the cam 53 results in a high initial mechanical advantage as the cam initially contacts and unseats a valve ball. The simplicity and very high initial mechanical advantage of the above-described distribution valve makes it highly reliable and low in manufacturing cost.

Referring now to FIGS. 6-12, a further improved embodiment of the invention, which is the subject matter of this continuation-in-part application, is shown. The distribution valve is designated by reference numeral 70 in FIG. 6, and includes an upper dome-shaped section 5 and a lower dome-shaped section 6, an impeller assembly 27, five outlet ports 10, five spherical ball valves collectively referred to by reference numeral 56, and a foot-shaped cam 53 which are essentially the same as described with reference to FIGS. 1–5. Where appropriate, the same reference numerals are used in FIGS. 1–5 to designate corresponding elements.

A primary new element shown in the embodiment of FIGS. 6–12 is an upper cam 71 which is rigidly attached to foot-shaped cam 53, previously described in detail. Upper cam 71 includes a horizontal plate or web 78 having a plurality of openings 77 which allow passage of fluid from the upper chamber 12 into the lower section 6 so the fluid can pass through the outlet port 10 which is not blocked by one of the spherical balls 56.

Figure 6:
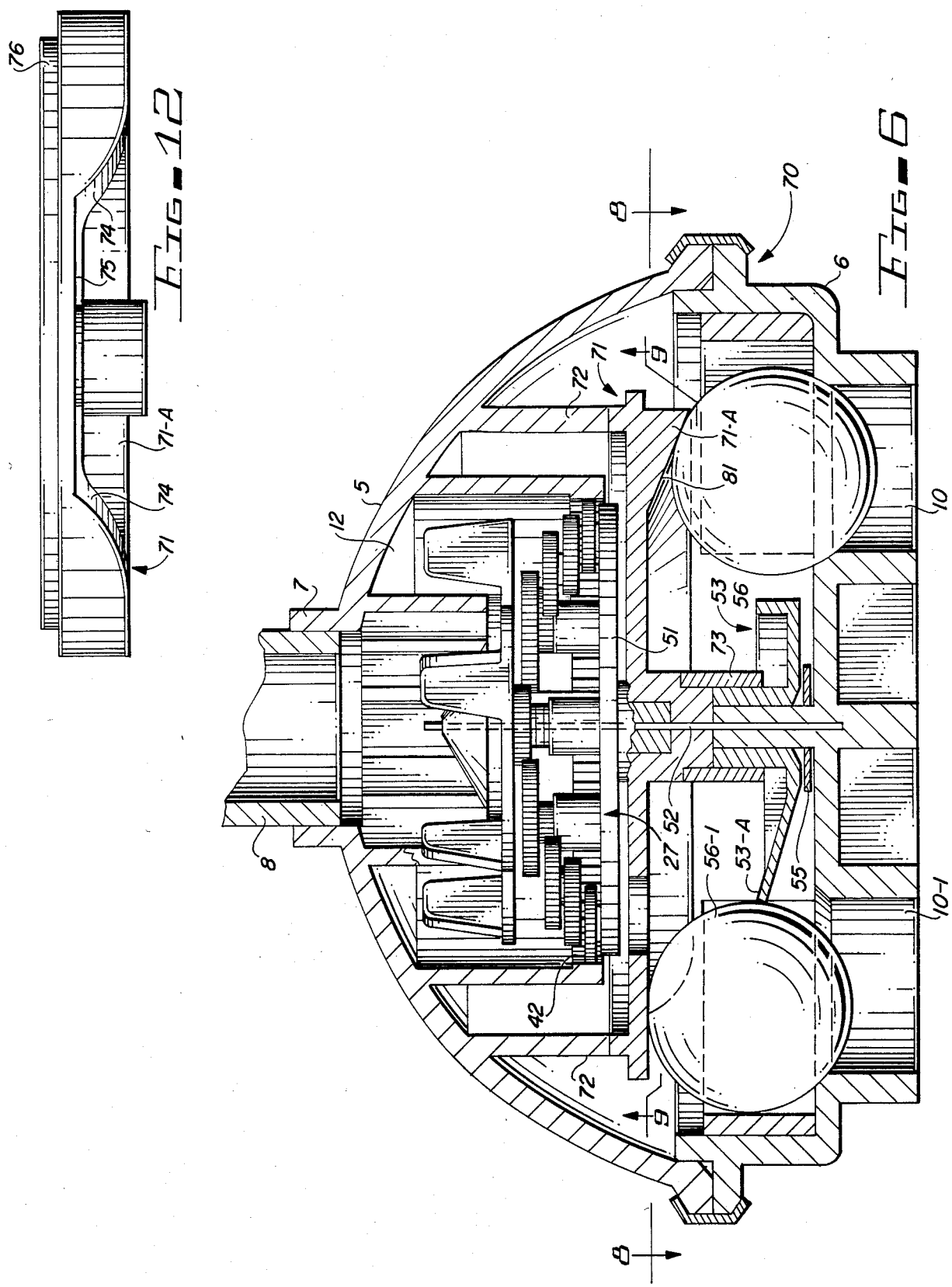
FIG. 6 is a section view of an embodiment of the invention including a dual cam structure that prevents the valve balls from being displaced from their seats except when they are so displaced by the toe of a foot-shaped cam.
Figure 7:
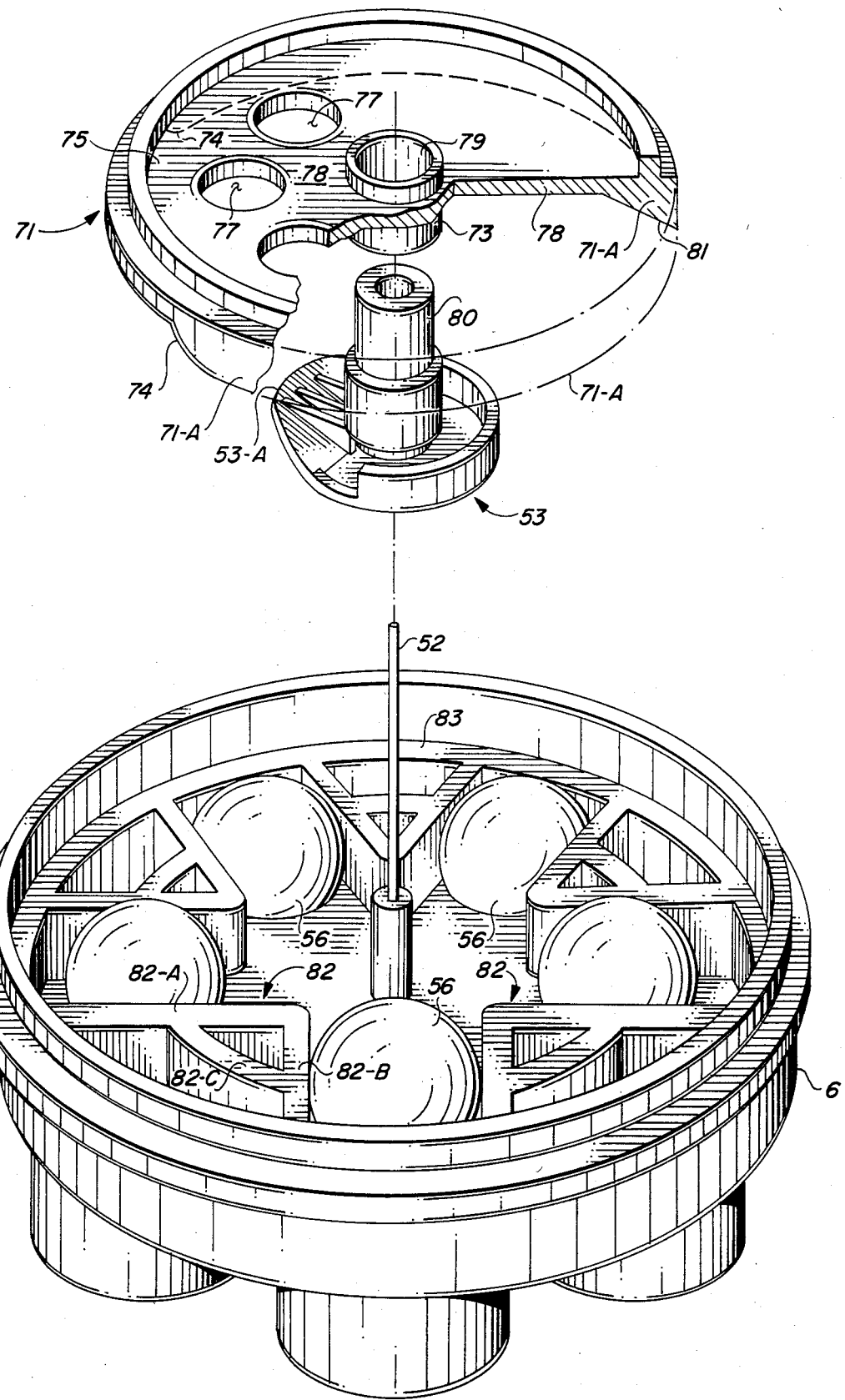
FIG. 7 is a partial perspective exploded view of the embodiment of the invention shown in FIG. 6.

In accordance with the present invention, upper cam 71 has a ring-shaped flange 71-A having a sloped inner surface 81, as best seen in FIGS. 6, 9, and 10. As best seen in FIG. 6, the sloped inner surface 81 holds all of the valve balls 56 except one against their respective valve seats. The valve seats are the inclined upper edges of the outlet ports 10, which edges form a seal with the surface of the spherical balls, thereby closing the outlet ports when the balls are seated.

However, the ring-shaped flange 71-A does not circumscribe a full circle. Instead, a gap 75 is provided therein which is wide enough to allow the one of the spherical balls 56 presently being lifted by the toe 53-A of foot-shaped cam 53 to be displaced upward above the seat of the corresponding outlet port, which in FIGS. 6 and 8 is designated by reference numeral 56-1. The gap referred to is designated by reference numeral 75, and is best illustrated in FIG. 12. The opposite sides of gap 75 have sloped surfaces designated by reference numeral 74. The slopes of the surfaces 74 correspond to the rate at which the valve ball is raised as the foot-shaped cam 53 and the upper cam 71 slowly rotate. Thus, the valve ball 56-1 presently being lifted gradually "follows" the appropriate one of sloped surfaces 74 up to the top of gap 75. Similarly, the opposite sloped surface 74 "follows" that valve ball 56-1 back down into its seat as it is gradually lowered by further rotation of the toe 53-A of foot-shaped cam 53.

Thus, it can be seen that the upper cam 71 avoids the problem previously described herein wherein momentum reversals of fluid in the long lines connected to the outlet ports 10 cause noisy, undesired bouncing or "hammering" of the valve balls 56 up and down on their seats, causing excessive noise and strain on the entire fluid system.

Our earlier attempts at implementing the upper cam 71 showed that engagement of the sloped surface 74 with a valve ball 56 as that ball was being lifted by the toe 53-A of foot-shaped cam 53 sometimes caused severe "binding" as the sloped surface 74 would exert a downward force on the valve ball, pressing it harder against the sloped valve seat, tending to cause the ball to "roll" up the slope of the valve seat, rather than be lifted by the toe of the foot-shaped cam. In order to prevent this from occurring, it was necessary to provide the dividers generally designated by reference numeral 82 in FIGS. 7 and 8. Each divider 82 includes two walls, such as 82-A and 82-B in FIG. 7. Each wall allows only a small amount of tolerance between the outer vertical surface of that wall and the surface of an adjacent valve ball 56 when it is properly seated. Thus, the balls 56 cannot roll sideways as a result of force exerted thereon by the sloped surfaces 74 of the upper cam 71. The only displacement of the valve balls that occur is when they are lifted vertically by the foot-shaped cam 53. To prevent flexing of the walls 82-A and 82-B, cross members such as 82-C (FIG. 7) are provided, preferably directly opposed to the contact points of the walls 82-A and 82-B with the adjacent valve balls 56 to provide maximum reinforcement.

In FIGS. 9 and 11, reference numeral 84 designates the outline of a slight cutout in the lower surface of the web 78 of upper cam 71 in order to accommodate a valve ball 56 lifted to its highest position by the foot-shaped cam.

The above-described modifications of the earlier described embodiment of the invention completely solve the problem of undesired, repetitive displacements and "hammering" of the valve balls 56, and accomplish this function without adding undue additional complexity or cost to the earlier described distribution valve.

While the invention has been described with reference to a particular embodiment thereof, those skilled in the art will be able to make certain modifications apart from the disclosed embodiment of the invention but are within the true spirit and scope of the invention.

We claim:

1. A fluid distribution apparatus having an inlet port for receiving fluid under pressure and also having a plurality of outlet ports through which the received fluid is sequentially expelled under pressure, said fluid distribution apparatus comprising in combination:
   (a) a housing having said inlet port and said plurality of outlet ports therein, said housing bounding an interior chamber, said inlet port directing flow of said fluid downward into said chamber;
   (b) a rotary impeller disposed beneath said inlet port in said chamber, said impeller having a first gear attached rigidly thereto;
   (c) a planetary gear attached in stationary relationship to said housing in the interior thereof;
   (d) gear reduction means having a second gear for meshing with said first gear and a third gear responsive to rotation of said second gear in geared-down relationship thereto for meshing with said planetary gear, said gear reduction means including a rotary base for supporting said second and third gears, said rotary base rotating in geared-down relationship to said impeller in response to rotation of said impeller;
   (e) a plurality of spherical valve balls each usually seated in a corresponding circular seating surface located at a respective one of said outlet ports to close that outlet port;
   (f) first cam means, rigidly attached in fixed relationship to said rotary base and rotating in response to rotation of said impeller in geared-down relationship to said impeller, for sequentially unseating respective ones of said valve balls to allow fluid to be ejected from said chamber through unseated outlet ports; and
   (g) second cam means, rigidly attached in fixed relationship to said rotary base and rotating in fixed relationship with said first cam means, for maintaining all of said valve balls except those presently unseated by said first cam means in their seated positions to prevent fluid momentum reversals of fluid with closed said outlet ports from unseating the ones of said valve balls seated on said closed outlet ports.

2. The fluid distribution valve of claim 1 wherein said rotary impeller includes a rotary star-shaped plate and a plurality of vertical vanes supported by protrusions of said star-shaped plate for rotating in response to flow of fluid into said chamber through said inlet port, said fluid distribution valve also including a plurality of stationary, substantially vertical baffles disposed in said chamber between said inlet port and said impeller, each of said baffles extending nearly to the upper surface of said star-shaped plate, each of said vertical baffles constraining said fluid to flow against said vanes of said impeller as it rotates said stationary baffles and cooperating with said star-shaped plate of said impeller to constrain a substantial portion of the incoming fluid to flow directly against said vanes of said impeller and then to allow that fluid to pass unimpeded lower into said chamber as said impeller continues to rotate.

3. The fluid distribution apparatus of claim 2 wherein said first cam means has a substantially oval, eccentric ball-engaging surface having a shape such that the point at which the ball-engaging surface of said first cam means touches the next valve ball to be seated has a relatively short initial radius from the eccentric point of said first cam means to that point, the radius of the point of contact with that valve ball having values that increase to a maximum value that is substantially greater than the initial radius as said first cam means rotates past that valve ball.

4. The fluid distribution apparatus of claim 3 wherein said second cam means includes a rotating, generally ring-shaped camming surface disposed to above the valve balls which are seated at the closed outlet ports, the generally ring-shaped camming surface having a raised section aligned with said maximum radius contact point of said first cam means in order to avoid forcing one of said valve balls presently being displaced from the seating surfaces of one of the outlet ports by said first cam means against the generally ring-shaped camming surface.

5. The fluid distribution apparatus of claim 4 wherein said ring-shaped camming surface is supported by a circular web attached in fixed relationship to said rotary base of said gear reduction means, said circular web having an opening therein for allowing fluid to pass through said circular web.

6. The fluid distribution apparatus of claim 5 wherein said first, second, and third gears being disposed immediately beneath said impeller whereby a high level of turbulence of fluid received from said impeller effects continual flushing and cleaning of the gears in said gear reduction means to prevent build-up of deposits thereon.

7. The fluid distribution apparatus of claim 5 wherein said ring-shaped camming surface slopes upward to said raised section thereof, said fluid distribution apparatus further including retaining means for preventing sideways displacement of said valve balls, to thereby prevent said sloped portion of said ring-shaped camming surface from forcing said valve balls to roll sideways up the slopes of their respective seating surfaces and thereby avoiding binding of the valve balls between their valve seats and said ring-shaped camming surface.

8. The fluid distribution apparatus of claim 7 wherein the bottom surface of said foot-shaped cam includes a spacer element to prevent peripheral portions thereof from frictionally engaging the interior of said housing.

9. The fluid distribution apparatus of claim 8 wherein said gear reduction means includes two substantially identical symmetric chains of gears each having a first gear that engages said first gear of said impeller and each having an outer gear that engages opposed portions of said planetary gear in order to balance forces on said rotary base and minimize wear of said first, second, third, and planetary gears.

10. The fluid distribution valve of claim 9 wherein each of the gears of said gear reduction assemblies and said first gear are composed of plastic material.

11. The fluid distribution valve of claim 10 wherein said impeller is composed of plastic material.

* * * * *